United States Patent [19]
Hoppenheit et al.

[11] Patent Number: 5,579,818
[45] Date of Patent: Dec. 3, 1996

[54] SOLID RUBBER TIRE WITH WOUND OVERLAY REINFORCEMENT STRUCTURE

[75] Inventors: Reinhard Hoppenheit, Hardegsen; Siegfried Pooch, Korbach; Bernd Backhaus, Buchenberg/Vöhl; Lothar Salokat, Liebenau-Ersen; Robert Pohlmann, Arolsen; Klaus Ehlers, Korbach, all of Germany

[73] Assignee: Continental Aktiengesellschaft, Hanover, Germany

[21] Appl. No.: 234,643

[22] Filed: Apr. 28, 1994

[30] Foreign Application Priority Data

Apr. 28, 1993 [DE] Germany ......................... 43 13 916.7
Apr. 28, 1993 [DE] Germany ......................... 43 13 917.5

[51] Int. Cl.⁶ ............................................. B60C 7/28
[52] U.S. Cl. ........................................ 152/393; 152/323
[58] Field of Search ........................... 152/323, 324, 152/325, 326, 327, 328, 329, 393, 394, 155; 156/112, 113

[56] References Cited

U.S. PATENT DOCUMENTS

| 844,821 | 2/1907 | Marks | 152/393 |
|---|---|---|---|
| 1,145,063 | 7/1915 | Hale | 152/393 |
| 1,349,914 | 8/1920 | Pratt | 156/112 X |
| 1,484,937 | 2/1924 | Egerton | 152/394 X |

FOREIGN PATENT DOCUMENTS

| 521605 | 8/1953 | Belgium | 152/323 |
|---|---|---|---|
| 0524002 | 1/1993 | European Pat. Off. . | |
| 1218119 | 5/1960 | France | 152/323 |
| 538563 | 5/1956 | Germany | 152/323 |
| 1926144 | 11/1970 | Germany | 152/323 |
| 2617417 | 11/1977 | Germany | 152/323 |
| 563673 | 7/1957 | Italy | 152/323 |
| 841660 | 7/1960 | United Kingdom . | |
| 2051699 | 1/1981 | United Kingdom . | |

*Primary Examiner*—Russell D. Stormer
*Attorney, Agent, or Firm*—Robert W. Becker & Associates

[57] ABSTRACT

A solid rubber tire comprised of rubber or plastic having elastomeric properties has a bottom layer and a tread portion connected to the bottom layer. A reinforcement structure for the bottom layer is provided in the form of a textile reinforcement element or a metal reinforcement element. The reinforcement structure is a wound overlay having at least one reinforcement layer which is produced by winding the reinforcement element in a plurality of windings so as to extend over at least 20% of the axial width of the bottom layer. The reinforcement element can be a cord, wire or cable. The reinforcement element may also be a cord material strip having individual reinforcement members arranged in parallel. The reinforcement members can be textile or metal reinforcement members in the form of cord, wire or cable. A method for producing the solid rubber tires is disclosed.

9 Claims, 6 Drawing Sheets

SOLID RUBBER TIRE WITH WOUND OVERLAY REINFORCEMENT STRUCTURE

BACKGROUND OF THE INVENTION

The present invention relates to a solid rubber tire comprised essentially of rubber or a plastic material with elastomeric properties and having a tread portion, a bottom layer, and a reinforcement structure for the bottom layer which is comprised of textile or metallic reinforcement elements.

In known solid rubber tires the reinforcement structure for the bottom layer in general is comprised of a plurality of wire packages or steel rings that, in the axial direction, are spaced from one another and positioned within the solid rubber tire at a small distance to its bottom surface. Such wire packages are positioned in the vicinity of the bottom surface of the solid rubber tire and are embedded in a bottom layer made of high-viscosity hard rubber. Other solid rubber tires are known in which the bottom layer is comprised of a fiber-reinforced rubber mixture. When using wire packages they must be applied by hand during building of the green tire in a tedious procedure which is very time consuming and results in relatively large manufacturing tolerances.

It is therefore an object of the present invention to provide a solid rubber tire in which the green tire can be produced in a continuous, automated manufacturing process and which also ensures a secure seat on the rim during use of the finished tire product.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

According to a first suggested solution for a tire of the aforementioned kind, the solid rubber tire comprised of a material selected from the group consisting of rubber and plastic having elastomeric properties according to the present invention is primarily characterized by:

A bottom layer;

A tread portion connected to said bottom layer;

A reinforcement structure for the bottom layer, the reinforcement structure comprised of a reinforcement element selected from the group consisting of textile reinforcement elements and metal reinforcement elements;

The reinforcement structure being a wound overlay having at least one reinforcement layer consisting of one reinforcement element wound in a plurality of windings and extending over at least 20% of the axial width of the bottom layer; and The reinforcement element selected from the group consisting of cord, wire, and cable.

Preferably, the textile reinforcement element is selected from the group consisting of a natural fiber and a synthetic fiber.

Advantageously, the reinforcement element has a diameter of less than 2 mm.

Expediently, the bottom layer has a radial inner bottom surface and the at least one reinforcement layer extends parallel to the bottom layer.

The reinforcement element preferably has a rubber sheath or rubber coating, i.e., is enclosed or coated by rubber.

Advantageously, the bottom layer has a radially inner bottom surface and the radially innermost one of the at least one reinforcement layer has a spacing of 0 to 25 mm to the bottom surface.

In a preferred embodiment of the present invention, the spacing between adjacent ones of the windings within the at least one reinforcement layer is constant and is less than 20 mm.

In another preferred embodiment of the present invention, the spacing between adjacent ones of the windings within the at least reinforcement layer varies. Preferably, the reinforcement structure has a plurality of reinforcement layers whereby in the axial direction of the solid rubber tire in first zones the spacing between the windings of the reinforcement element is tighter than in second zones so that reinforcement element packages are formed.

Expediently, the bottom layer has a radial inner bottom surface shaped as a (mirror-symmetrical) truncated double cone and the wound overlay is radially inwardly curved toward the axial center of the bottom surface.

In a second suggested solution for a tire of the aforementioned kind, the solid rubber tire comprised of material selected from the group consisting of rubber and plastic having elastomeric properties according to the present invention is primarily characterized by:

A bottom layer;

A tread portion connected to the bottom layer;

A reinforcement structure for the bottom layer, the reinforcement structure comprised of a reinforcement element;

The reinforcement structure being a wound overlay having at least one reinforcement layer consisting of one reinforcement element wound in a plurality of windings and extending over at least 20% of an axial width of the bottom layer;

The reinforcement element being a cord material strip having individual reinforcement members arranged parallel to one another, the reinforcement member selected from textile reinforcement members and metal reinforcement members; and The reinforcement members selected from the group consisting of cord, wire, and cable.

Preferably, the textile reinforcement member is selected from the group consisting of a natural fiber and a synthetic fiber.

Advantageously, the individual reinforcement member has a diameter of less than 2 mm.

Preferably, the bottom layer has a radially inner bottom surface and the at least one reinforcement layer extends parallel to the bottom surface.

In a preferred embodiment, the reinforcement element comprises a rubber matrix in which rubber matrix the reinforcement members are embedded.

In another embodiment of the present invention, the bottom layer has a radially inner bottom surface and a radially innermost one of the at least one reinforcement layer has a spacing of 0 to 25 mm to the bottom surface.

Preferably, a spacing between adjacent windings within the at least one reinforcement layer is constant and is less than 20 mm.

Preferably, a spacing between adjacent windings within the at least one reinforcement layer varies. Expediently, the wound overlay has one reinforcement layer and adjacent windings abut one another.

In the alternative, the wound overlay has one reinforcement layer and adjacent windings are spaced from one another at a small distance.

In another embodiment of the present invention, adjacent windings overlap.

Preferably, the wound overlay has a central portion and axially outer portions adjacent to the central portion, wherein in the axially outer portions adjacent windings overlap one another and in the central portion adjacent windings abut one another. In an alternative embodiment of the present invention, the windings in the axially outer portions overlap one another while the windings in the central portion are spaced from one another at a small distance.

The present invention is also concerned with method for manufacturing a solid rubber tire comprised of a tread portion, a bottom layer, and a reinforcement structure for the bottom layer. A first method according to the present invention comprises the following steps:

Placing a portion of a bottom layer onto a winding drum;

Winding onto the portion of the bottom layer in a plurality of adjacent windings a reinforcement element selected from a textile reinforcement element and a metal reinforcement element to build the reinforcement structure for the bottom layer in the form of a wound overlay having at least one reinforcement layer and extending over at least 20% of an axial width of the bottom layer, wherein the reinforcement element is selected from the group consisting of cord, wire, and cable;

Completing the bottom layer; and

Finishing building of the solid rubber tire.

In a second method for manufacturing a solid rubber tire according to the present invention the following steps are included:

Placing a portion of a bottom layer onto a winding drum;

Winding onto the portion of the bottom layer in a plurality of adjacent windings a reinforcement element in the form of a cord material strip having individual reinforcement members, selected from textile reinforcement members and metal reinforcement members and arranged parallel to one another, to build the reinforcement structure for the bottom layer in the form of a wound overlay having at least one reinforcement layer and extending over at least 20% of an axial width of the bottom layer, wherein the reinforcement members are selected from the group consisting of cord, wire, and cable;

Completing the bottom layer; and

Finishing building of the solid rubber tire.

According to the present invention a reinforcement structure in the form of a wound overlay that comprises at least one reinforcement layer is provided, whereby the wound overlay is produced by winding an individual reinforcement element in the form of an individual wire, cable, or cord, in a plurality of windings such that the resulting wound overlay extends at least over 20% of the axial width of the bottom layer.

In an alternative solution, the reinforcement structure of the bottom layer is comprised of a wound overlay having at least one reinforcement layer which is produced by winding a cord material strip with a plurality of reinforcement members in the form of wires or cables or cords arranged adjacent to one another in parallel in a plurality of windings which wound overlay extends at least over 20% of the axial width of the bottom layer.

The present invention has the advantage of providing a mechanical installation of the reinforcement structure within the bottom layer. This results in a faster manufacturing process as well as in considerably reduced manufacturing tolerances. Furthermore, the amount of discards (defective tires) can be reduced.

For producing the wound overlay a portion of the bottom layer of the solid rubber tire is applied to a winding drum in a first step and, subsequently, the reinforcement element in the form of an individual cord or wire or cable is applied with a device, known per se in the art of tire building, at an adjustable pretension onto the portion of the bottom layer positioned on the winding drum. The feed of the individual cable or wire or cord which defines the spacing between the individual windings of the wound overlay can be adjusted. The individual wire or cord or cable of the wound overlay can be comprised of a textile material made of natural fibers or synthetic fibers. However, it is also possible to use metallic wires or wire cables. The cord or wire or cable may be rubberized, i.e., have a rubber coating or sheath, or may be without such a coating. The cord or wire or cable should have a diameter of less than 2 mm. The wound overlay may be a single-layer overlay or a multiple-layer overlay whereby during production a plurality of layers can be produced in one manufacturing step by winding back and forth in the axial direction of the tire.

In general, the wound overlay will be positioned within the bottom layer such that it extends parallel to the bottom surface of the solid rubber tire. It is preferable that the reinforcement layer has a distance of 0 to 25 mm to the bottom surface of the solid rubber tire. It may also be expedient to produce the wound overlay such that it is curved within the cross-section of the tire, i.e., that it is essentially spherical. According to a further embodiment of the invention a solid rubber tire with a truncated double cone bottom surface may be provided with a wound overlay that in the central area is radially inwardly curved. The spacing between the windings of the wound overlay may be selected to be constant and preferably less than 20 mm, most prefered less than 10 mm.

For certain solid rubber tires, however, it is expedient to select the spacing between the windings of the wound overlay to be variable. Especially for a wound overlay with multiple layers it is expedient to wind the wire in the axial direction in certain zones closer together (tighter) than in other zones so that "wire packages" result which have substantially the effect of the known wire packages in the bottom layer in solid rubber tires of the prior art. However, the inventive "wire packages" can be wound and arranged with the inventive method in a more uniform manner.

When using a cord material strip for producing the wound overlay, the cord material strip is comprised of 2 to 20 individual reinforcement members arranged parallel to one another within the strip which are preferably embedded in a rubber matrix so that the strips stay together and can be bonded within the solid rubber tire to the neighboring rubber layers. The cord material strip can have a width of 3 to 30 mm. The reinforcement members of the cord material strips can be a textile material made of natural fibers or synthetic fibers. However, it is also possible to use metallic wires, respectively, wire cables. The reinforcement members should have a diameter of less to 2 mm.

For generating the wound overlay, in general, a portion of the bottom layer of the solid rubber tire is placed onto a winding drum in a first step and, subsequently, the cord material strip is removed from a device known for tire building at an adjustable pretension and wound onto the portion of the bottom layer positioned on the drum whereby the feed which determines the spacing between the individual windings of the wound overlay is also adjustable. The wound overlay may be a single or multiple-layer wound overlay whereby during production of multiple reinforcement layers in one manufacturing step the reinforcement element, i.e., the cord material strip, is wound back and forth in the axial direction.

In general, the wound overlay will be arranged within the bottom layer of the solid rubber tire such that it extends parallel to the bottom surface of the tire. It is preferable that the wound overlay has a distance of 0 to 25 mm to the bottom surface of the solid rubber tire. The spacing of the windings of the wound overlay may be selected to be constant and should have a spacing of less than 30 mm, preferably less than 15 mm.

For certain solid rubber tires it is expedient to select the spacing of the windings of the wound overlay to be variable. It is especially expedient to wind the windings in the outer axial portions of the solid rubber tire so as to overlap and in the central portion so as to abut one another or to have a small spacing therebetween. Due to the automated adjustability of pretension and spacing between windings for the cord material strip of the wound overlay a tire with a very high manufacturing precision may be produced.

DESCRIPTION OF PREFERRED EMBODIMENTS

The present invention will now be described in detail with the aid of several specific embodiments utilizing FIGS. 1 through 12.

Rubber in the context of the present invention refers to natural and synthetic rubber materials as well as plastic materials with elastomeric properties.

Figure 1:
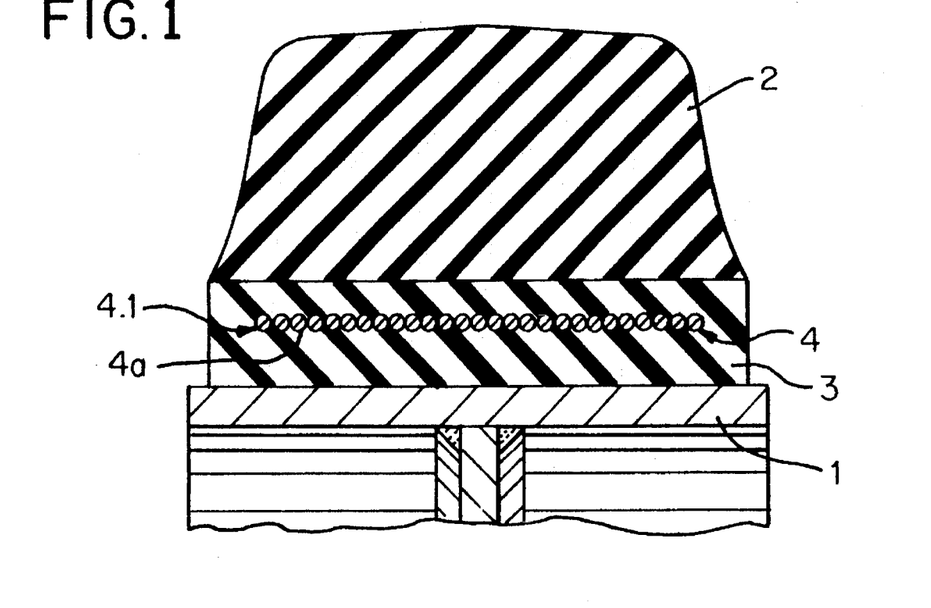
FIG. 1 shows a solid rubber tire with a reinforcement structure for the bottom layer in the form of a single-layer wound overlay.

The solid rubber tire of FIG. 1 is positioned on a cylindrical rim 1 and is substantially comprised of a tread portion 2 and a bottom layer 3. The bottom layer 3 is comprised of a high-viscosity hard rubber while the rubber of the tread portion 2 is elastic and selected so as to be highly wear-resistant.

In the bottom layer 3 a reinforcement structure in the form of a single-layer (4.1) wound overlay 4 is provided which is produced from an individual reinforcement element, i.e., an individual wire, an individual cord, or an individual cable indicated at 4a. The wound overlay 4 in the axial direction extends at least over 80% of the width of the bottom surface 3a of the solid rubber tire. With narrow solid rubber tires it may be sufficient when the wound overlay 4 extends to at least 20% of the width of the bottom surface 3a. Preferably, the wound overlay 4 extends at least over half the axial width.

For generating the green tire of a solid rubber tire a portion of the bottom layer 3 is positioned on a winding drum. Subsequently, the wound overlay 4 is produced by removing an individual reinforcement element from a reeling device and applying the individual reinforcement element onto the portion of the bottom layer 3 positioned on the drum whereby pretension and feed are adjusted so that a reproducible green tire with exactly the same properties can be manufactured. After producing the wound overlay 4, the remainder of the bottom layer 3 is placed onto the wound overlay 4 and, subsequently, the green tire is completed by applying the tread portion 2.

Figure 2:
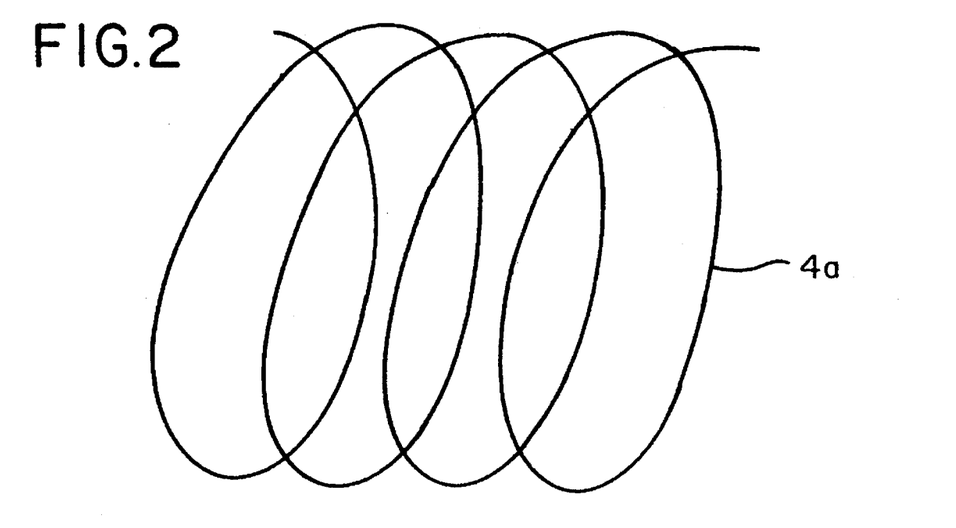
FIG. 2 shows the wound overlay in a perspective view.

FIG. 2 shows in a perspective representation the windings of the wound overlay 4 made of an individual reinforcement element 4a.

Figure 3:
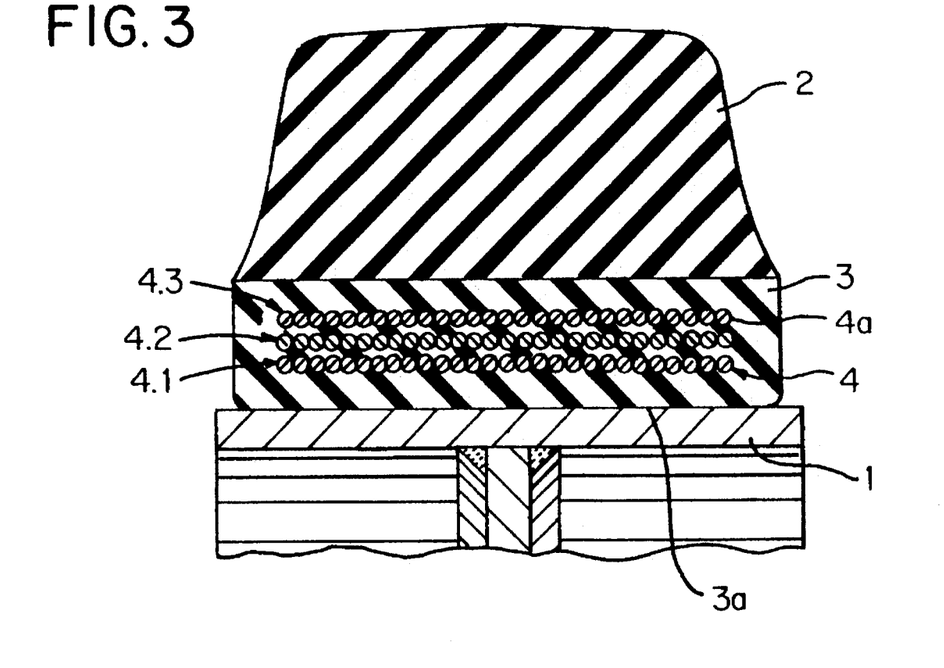
FIG. 3 shows the solid rubber tire with a three-layer wound overlay.

The embodiment according to FIG. 3 differs from the embodiment of FIG. 1 such that the wound overlay 4 comprises three reinforcement layers 4.1, 4.2, 4.3. The production of this wound overlay 4 is performed in one step whereby after applying the lowermost reinforcement layer 4.1 the direction of winding is reversed and for the generation of the third reinforcement layer 4.3 the winding direction of the first reinforcement layer 4.1 is again used.

Figure 4:
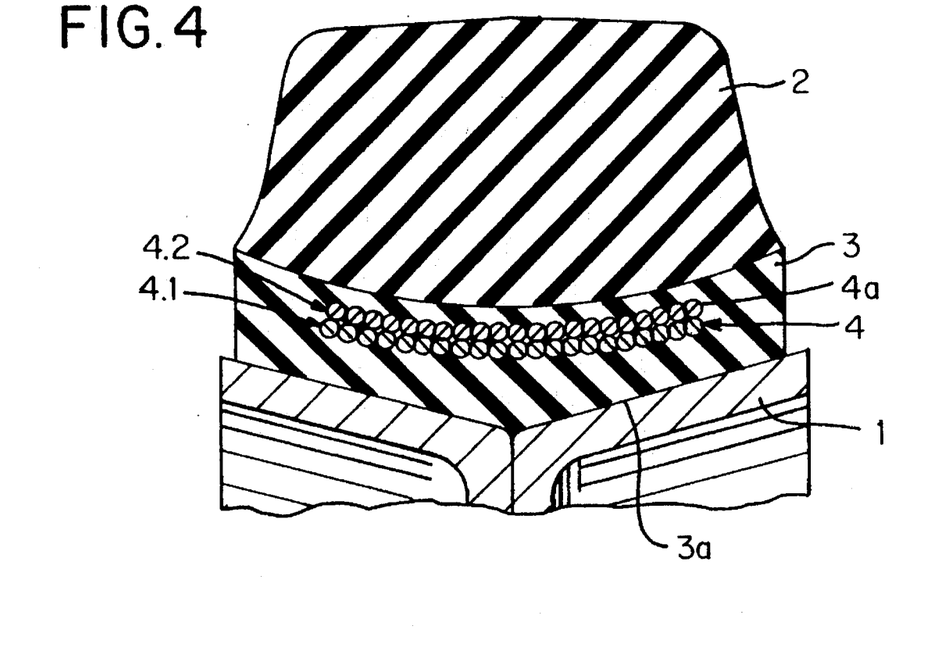
FIG. 4 shows a solid rubber tire with a bottom surface in the form of a truncated double cone and with a radially inwardly bent wound overlay.

In the embodiment according to FIG. 4 the solid rubber tire is positioned on a rim 1 which is in the form of a truncated double cone with the individual truncated cones being positioned mirror-symmetrical to one another and is comprised of a tread portion 2 and a bottom layer 3 with a reinforcement structure arranged therein. The reinforcement structure is comprised of a two-layer (4.1, 4.2) wound overlay 4 which is positioned at a distance to the bottom surface 3a of the solid rubber tire and which is curved radially inwardly towards the center.

Figure 5:
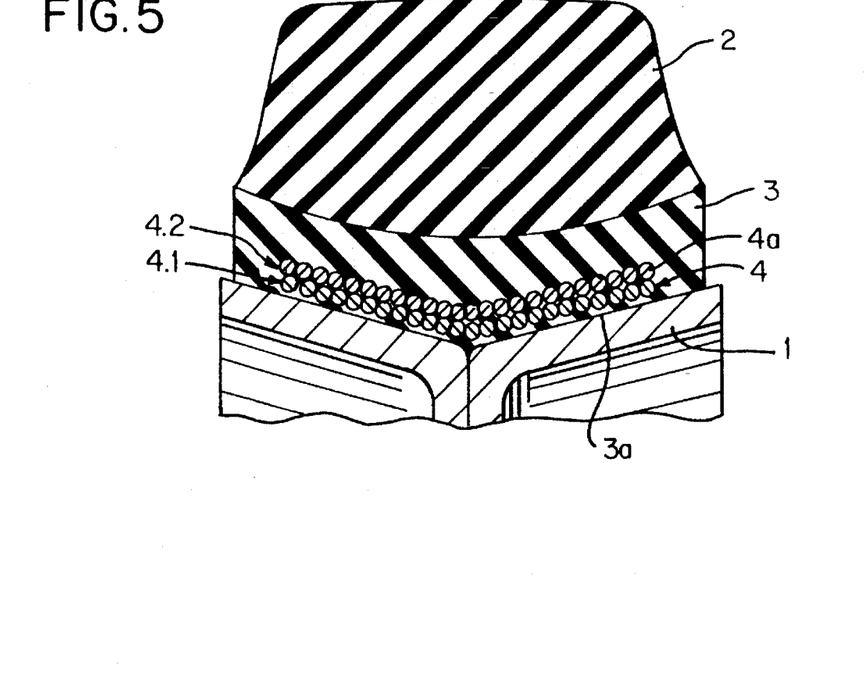
FIG. 5 shows a solid rubber tire with a bottom surface in the form of a truncated double cone and a wound overlay that is parallel to the bottom surface.

In the embodiment according to FIG. 5 the solid rubber tire is again positioned on a truncated double cone rim 1 and the reinforcement structure is in the form of a two-layer (4.1, 4.2) wound overlay 4. In this embodiment, the wound overlay 4 is arranged without spacing to the bottom surface 3a of the solid rubber tire and extends parallel to the bottom surface 3a so that the wound overlay is also in the form of a truncated double cone. The solid rubber tire is comprised of a tread portion 2 and a bottom layer 3 as in the previous embodiments.

Figure 6:
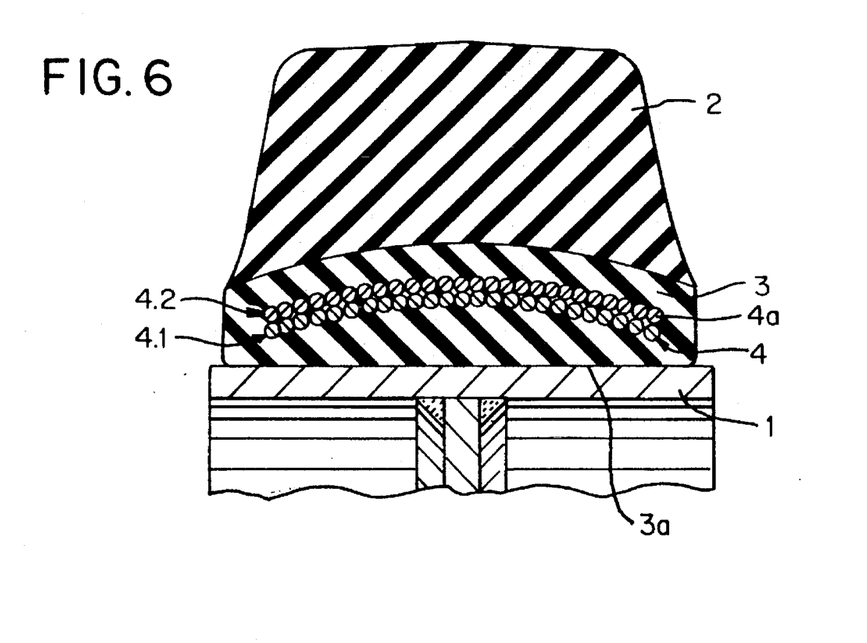
FIG. 6 shows a solid rubber tire with a cylindrical bottom surface and a spherical wound overlay.

In the embodiment according to FIG. 6 the solid rubber tire is positioned on a cylindrical rim 1 whereby the solid rubber tire is comprised of a tread portion 2 and a bottom layer 3. Within the bottom layer 3 a two-layer (4.1, 4.2) wound overlay 4 is positioned which extends substantially over the entire width of the bottom layer 3 and which is essentially spherically shaped.

Figure 7:
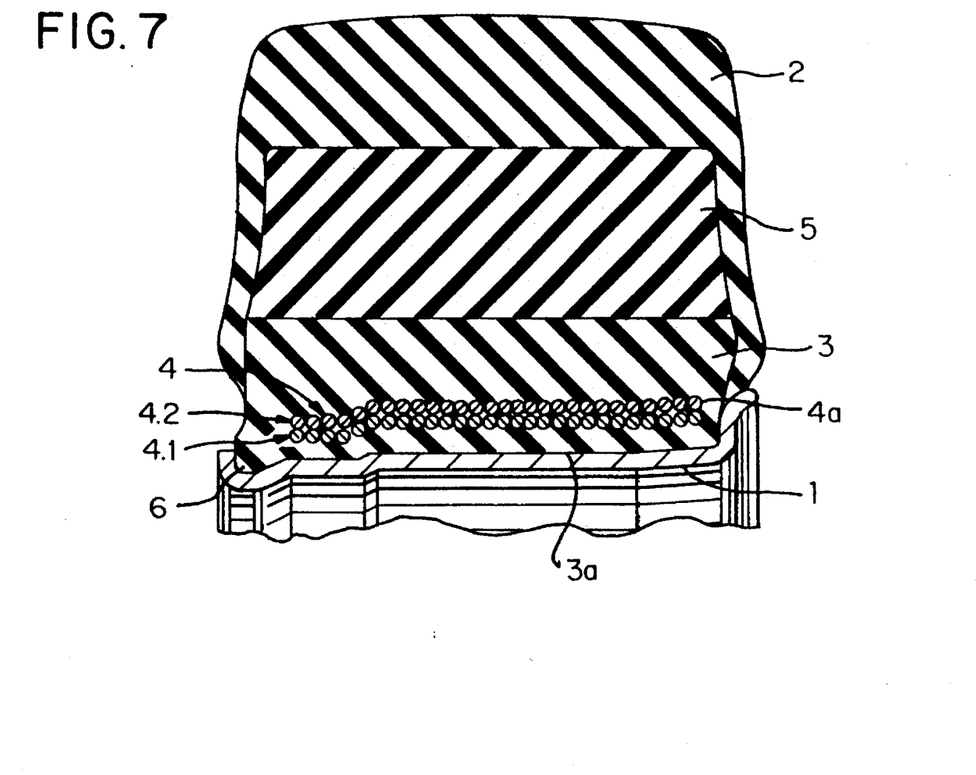
FIG. 7 shows a solid rubber tire with a stepped bottom surface and a wound overlay parallel to the bottom surface.

In the embodiment according to FIG. 7 the solid rubber tire is comprised of a tread portion 2 and a bottom layer 3 as well as an intermediate member 5, With this division into three parts a solid rubber tire results which exhibits extremely high driving comfort and a greater wear resistance because the tread portion 2 can be made of an extremely wear-resistant rubber while the intermediate member 5 is comprised of a highly elastic rubber. The rubber of the tread portion 2 surrounds the intermediate member 5 as well as parts of the bottom layer 3. The bottom layer 3 is comprised of a high-viscosity hard rubber. The solid rubber tire has a stepped bottom surface which is adapted to the contour of the stepped rim. A nose 6 engages a groove of the rim 1 so that a secure positioning on the rim is ensured. Within the bottom layer 3 a two-layer (4.1, 4.2) wound overlay 4 is positioned that is spaced at a distance to the bottom surface 3a and extends parallel to it. The wound overlay 4 begins at a position laterally spaced from the nose 6 and ends substantially at the other end of the bottom layer 3.

Figure 8:
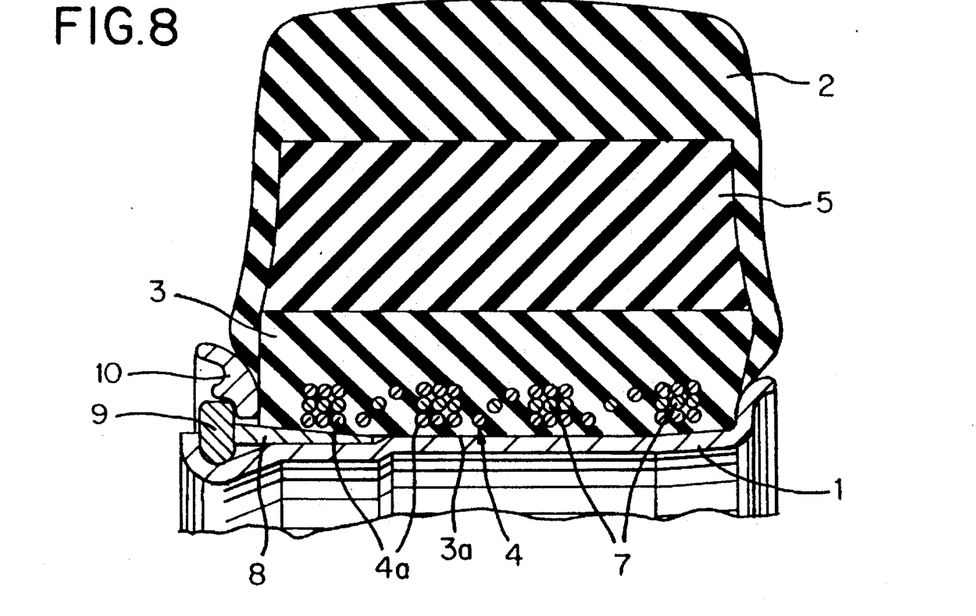
FIG. 8 shows a solid rubber tire with a stepped bottom surface and a three-layer wound overlay with a variable distance between windings.

FIG. 8 shows a solid rubber tire having rubber components substantially identical to the embodiment of FIG. 7. In the bottom layer 3 a three-layered wound overlay 4 is provided in which the individual reinforcement element, i.e., the cord or wire, in the axial direction is wound in certain zones more tightly (closer together) than in other zones so that four wire or cord packages 7 result. This wound overlay 4 can also be produced in a single manufacturing step. The solid rubber tire is positioned on a rim 1 which is comprised of a plurality of parts. For a secure seat of the tire on the rim, a shoulder ring 8, a lateral ring or wheel flange ring 9 as well as a closure ring 10 are provided.

Figure 9:
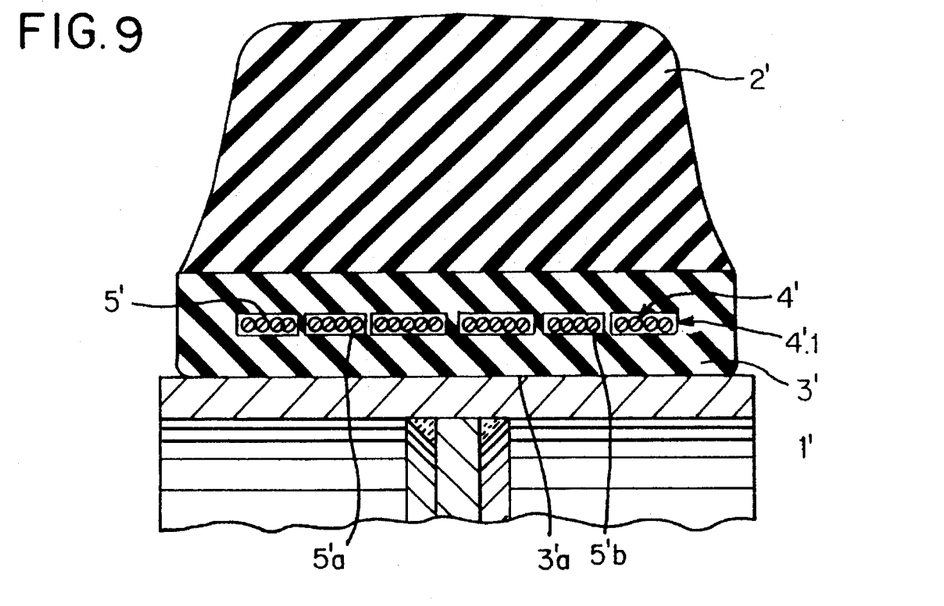
FIG. 9 shows a solid rubber tire with a reinforcement structure for the bottom layer in the form of a single-layer wound overlay with tightly wound windings.

The solid rubber tire of FIG. 9 is positioned on a cylindrical rim 1' and is comprised essentially of a tread portion 2' and a bottom layer 3'. The bottom layer 3' is made of a high-viscosity hard rubber while the rubber of the tread portion 2' is more elastic and very wear-resistant.

Within the bottom layer 3' a reinforcement structure in the form of a single-layer (4'.1) wound overlay 4' is provided which is made of a cord material strip 5' having windings that abut one another or are spaced at a small distance relative to one another. The material strip 51 has embedded in a rubber matrix 5'b individual reinforcement members 5'a. The wound overlay 4' in the axial direction extends to at least 80% of the width of the bottom surface 3'a of the solid rubber tire. With narrow solid rubber tires it may be sufficient when the wound overlay 4' extends over at least 20% of the width of the bottom surface 3'a. Preferably, the wound overlay 4' extends over at least half the axial width. For producing the green tire for the solid rubber tire, a portion of the bottom layer 3' is positioned on a winding drum. Subsequently, the wound overlay 4' is generated by removing the cord material strip 5' from a reeling device and applying it to the portion of the bottom layer 3' on the drum whereby pretension and feed can be exactly adjusted so that reproducible green tires with exactly the same properties can be produced. After completion of the wound overlay 4', the remainder of the bottom layer 3' is placed onto the drum, and then the green tire is completed by applying the tread portion 2'.

Figure 10:
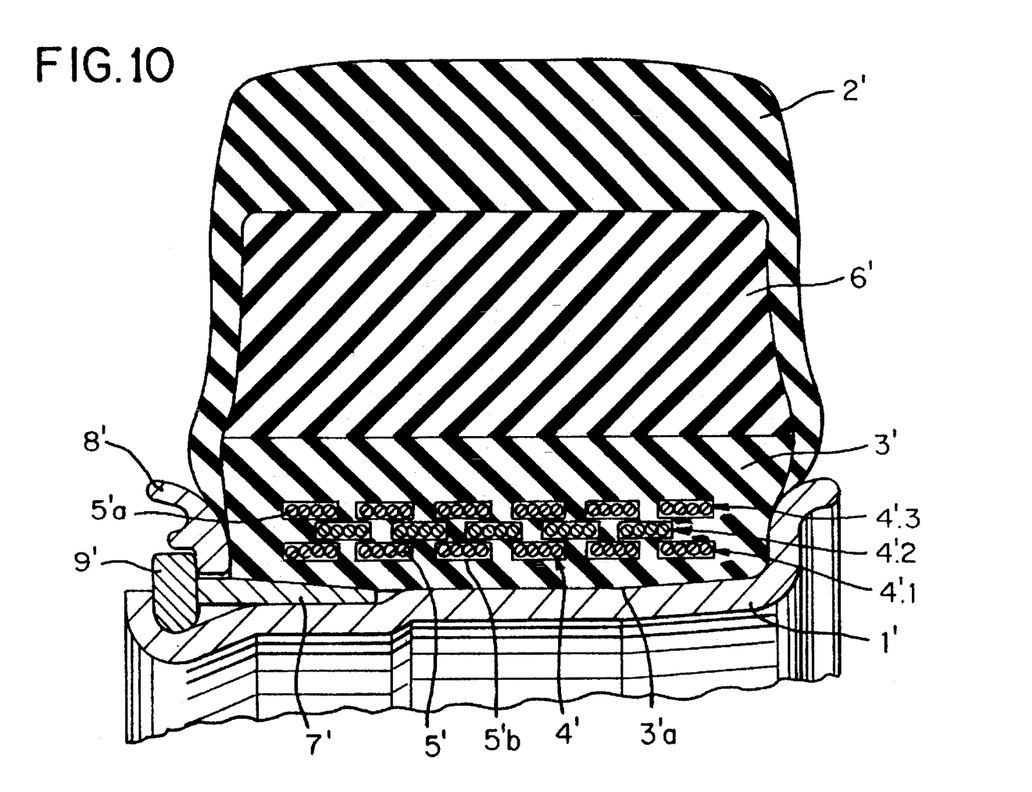
FIG. 10 shows a solid rubber tire with a three-layer wound overlay.

FIG. 10 shows a different type of a solid rubber tire with a tread portion 2' and a bottom layer 3' in which a reinforcement structure is located. Between the tread portion 2' and the bottom layer 3' an intermediate member 6' is provided. The rubber of the tread portion 2' surrounds the intermediate member 6' as well as parts of the bottom layer 3'.

The bottom layer 3' is again manufactured of a high viscosity hard rubber. The solid rubber tire is attached to a rim 1' which is comprised of multiple parts. For a secure seat of the tire on the rim 1', a shoulder ring 7', a lateral ring or rim flange ring 8' as well as a closure ring 9' are provided. A three-layered (4'.1, 4'.2, 4'.3) wound overlay 4' is positioned within the bottom layer 3' whereby the windings of the cord material strip 5' with its reinforcement members 5'a in the rubber matrix 5'b are spaced a short distance from one another. The wound overlay 4' is generated in a single manufacturing step by winding back and forth in the axial direction. The windings, if desired, may also abut one another. The wound overlay 4' is positioned at a distance to the bottom surface 3'a of the solid rubber tire within the bottom layer 3' and extends substantially parallel to the bottom surface 3'a.

Figure 11:
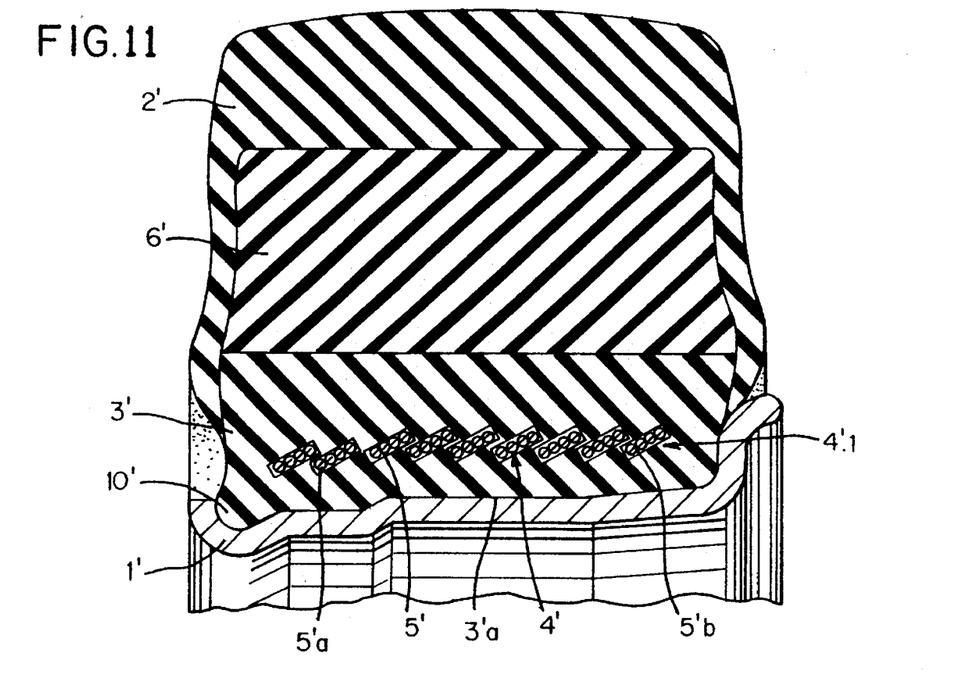
FIG. 11 shows a solid rubber tire with a single layer wound overlay housing overlapping windings.

In the embodiment according to FIG. 11 the solid rubber tire corresponds in its construction substantially to the embodiment of FIG. 10, but is provided with an additional mounting nose 10' which engages a groove of the rim 1' so that the tire can be mounted on a single-part rim. The single-layer (4'.1) wound overlay 4' in this embodiment is wound such that neighboring windings of the cord material strip 5' overlap, especially by about half their width. The wound overlay 4' again extends parallel to the bottom surface 3'a of the solid rubber tire and is positioned at a distance to the bottom surface 3'a.

Figure 12:
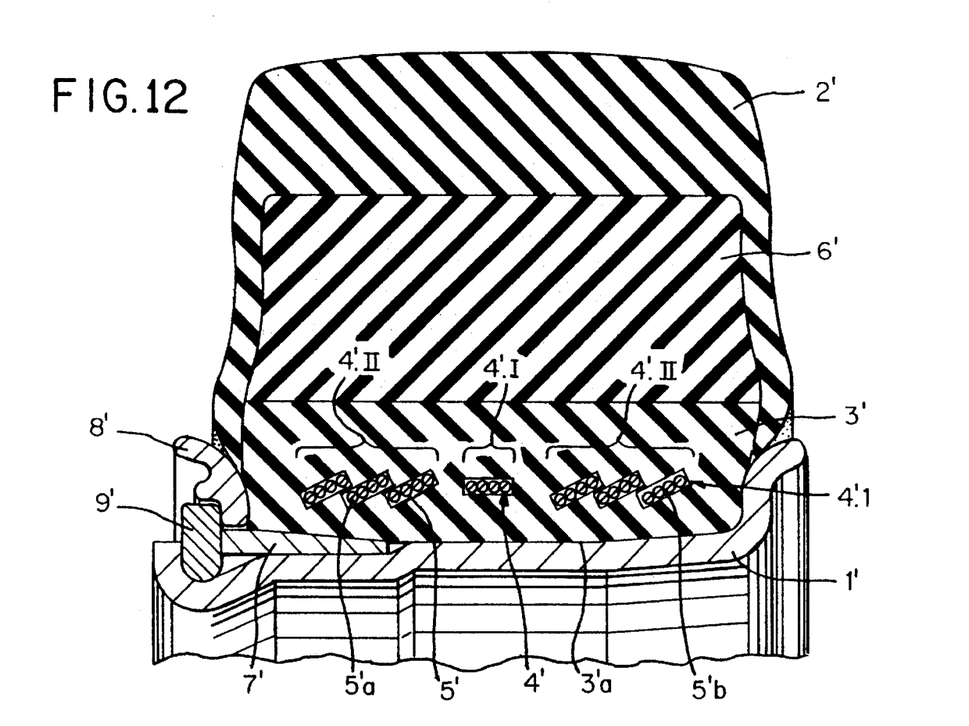
FIG. 12 shows a solid rubber tire with a single layer wound overlay having windings that overlap in the outer axial portions of the tire.

The solid rubber tire of FIG. 12 is provided with a single-layer (4'.1) wound overlay 4' located within the bottom layer 3' and has overlapping windings. In this embodiment the overlapping windings of the chord strip material 5' are located in the outer axial portion 4'.II of the solid rubber tire, while the central portion 4'.I is bridged by one or two windings so that the entire wound overlay 4' can again be manufactured in a single manufacturing step. When needed, the central area 4'.I may be embodied such that the windings of the wound overlay abut one another.

The present invention is, of course, in no way restricted to the specific disclosure of the specification and drawings, but also encompasses any modifications within the scope of the appended claims.

What we claim is:

1. A solid rubber tire comprised of a material selected from the group consisting of rubber and plastic having elastomeric properties, said solid rubber tire comprising:

a bottom layer;

a tread portion connected to said bottom layer;

a reinforcement structure for said bottom layer, said reinforcement structure comprised of a reinforcement element selected from the group consisting of textile reinforcement elements and metal reinforcement elements;

said reinforcement structure being a wound overlay having at least one reinforcement layer consisting of one said reinforcement element wound in a plurality of windings and extending over at least 20% of an axial width of said bottom layer;

said reinforcement element selected from the group consisting of cord, wire, and cable; and wherein a spacing between adjacent ones of said windings within said at least one reinforcement layer varies.

2. A solid rubber tire according to claim 1, wherein said textile reinforcement element is selected from the group consisting of a natural fiber and a synthetic fiber.

3. A solid rubber tire according to claim 1, wherein said reinforcement element has a diameter of less than 2 mm.

4. A solid rubber tire according to claim 1, wherein said bottom layer has a radially inner bottom surface and wherein said at least one reinforcement layer extends parallel to said bottom layer.

5. A solid rubber tire according to claim 1, wherein said reinforcement element has a rubber coating.

6. A solid rubber tire according to claim 1, wherein said bottom layer has a radially inner bottom surface and wherein a radially innermost one of said at least one reinforcement layer has a spacing of 0–25 mm to said bottom surface.

7. A solid rubber tire according to claim 1, wherein a spacing between adjacent ones of said windings within said at least one reinforcement layer is constant and is less than 20 mm.

8. A solid rubber tire according to claim 1, wherein said reinforcement structure has a plurality of said reinforcement layers and wherein in the axial direction of said solid rubber tire first and second zones are provided, wherein in said first zones said spacing between said windings of said reinforcement element is smaller than in said second zones so that reinforcement element packages are formed in said first zones.

9. A solid rubber tire according to claim 1, wherein in the axial direction of said solid rubber tire first and second zones are provided, wherein in said first zones said spacing between said windings of said reinforcement element is smaller than in said second zones.

* * * * *